Patented Dec. 18, 1928.

1,695,449

UNITED STATES PATENT OFFICE.

WILLIAM J. BANNISTER, OF TERRE HAUTE, INDIANA, ASSIGNOR TO COMMERCIAL SOLVENTS CORPORATION, OF TERRE HAUTE, INDIANA, A CORPORATION OF MARYLAND.

PROCESS FOR THE MANUFACTURE OF ESTERS.

No Drawing.   Application filed February 18, 1927.  Serial No. 169,409.

My invention relates to a method for the preparation of esters, and in particular, esters of the oxyfatty acids such as ethyl lactate. More particularly, my invention relates to a process of esterification wherein the water content of the reaction mixture resulting during the esterification is continually reduced, which improved procedure permits the reaction to go more nearly to completion, better yields being produced.

Steffens (U. S. Patents 1,421,604 and 1,421,605) has described a process of esterification conducted in the presence of a third liquid which is miscible with the alcohol but is substantially immiscible with water. Steffens conducts his reaction by heating the mixture and distilling off the constant-boiling mixture of vapors of water, alcohol and the third liquid until the greater portion of the water is removed, and then distilling the resulting ester to remove the remaining alcohol and third liquid present therein.

I have now found that, in accordance with my present invention, considerably better yields may be obtained in much shorter periods of time than by the esterification processes heretofore recommended by Steffens and others. I have found that these desirable results may be obtained by esterifying an alcohol and an acid in the presence of a dehydrating agent and in the presence of a liquid which forms a ternary boiling mixture with water vapor and alcohol vapor; said mixture boiling below the boiling temperature of the ester, alcohol, acid, and added liquid.

When an alcohol and an acid are mixed and heated, some ester is immediately formed together with an equivalent proportion of water. The reaction is a reversible one and cannot be completed unless one destroys, by some method, the equilibrium that is set up. One method of doing this is to remove the water formed during the esterification. Prior workers in this field have made use of ternary mixtures to remove the water as formed during esterification and thus higher yields of esters have been secured than would otherwise be possible. I have found that, while the major portion of the water present may be removed by this method, the removal of the last portions of the water, which is necessary to obtain high yields, is very difficult and takes long periods of time to carry even approximately to completion. The presence of even a small amount of water reduces the velocity of esterification to a large extent. By the removal of this small remaining amount of water from the reaction mixture greatly increased yields may be obtained; this is easily and practically accomplished by the present invention. I have found that this desirable result may easily be accomplished by the proper employment of a suitable material which serves as a dehydrating agent and removes the last small portion of water from the reaction mixture.

To illustrate the benefits attainable by my improved process, I shall first describe the manufacture of an ester, for example ethyl lactate, by prior art methods.

A mixture of 100 grams 75% lactic acid, 325 grams 95% ethyl alcohol, and 475 grams benzol is placed in a reaction flask. The large excess of ethyl alcohol is necessary in order to provide sufficient alcohol to react with all of the acid present after a considerable proportion of it has been removed as a component of a ternary mixture during the course of the reaction. The benzol takes no part in the reaction other than to provide one component of the ternary mixture for the removal of the water from the reaction mixture. Other materials than benzol which form ternary mixtures with the alcohol and water and having boiling points lower than that of the ester may be employed. In some methods of operating the process, however, it is desirable that this constituent be substantially immiscible with water in order to facilitate its separation from the latter in case the material is to be continuously, or otherwise, returned to the reaction mixture in the flask.

When the reaction mixture described above is heated, ethyl alcohol and lactic acid react to form ethyl lactate and water. When the temperature is raised to 64.8° C. a ternary mixture comprising 74.1% benzol, 18.5% ethyl alcohol, and 7.4% water distils over, the distillation being continued until 725 grams of distillate are collected. At this point it will be found that the greater portion of the water originally added with the ethyl alcohol and lactic acid has been removed. The conversion of the lactic acid to the ester is found to be about 15% of the theoretical. In order to increase this conversion the residue in the flask is refluxed for 5½ hours. At the end of this time the esterification is found to be about 50% complete. An addition of 50 grams ethyl alcohol and 125 grams benzol are then made, the refluxing continued for a time and distillate again removed. By continuing this operation for a period of 22½ hours the conversion of the lactic acid is found to be only approximately 71%. The effect of the relatively small amount of water remaining in the reaction mixture is such that the rate of conversion is greatly retarded.

Now I have found according to the present invention that the conversions given above and the rate of reaction may be greatly increased by the employment of small amounts of materials which take up water of crystallization. The addition of a small amount of such a material removes from the zone of reaction small traces of water extremely difficult to remove by means of the ternary boiling mixture alone, and allows the reaction to go to completion. Then, by a slight increase in the temperature the water of crystallization is given up by the type of material used without detriment to the reaction mixture and may be removed by distillation. In effect, the material used acts as a "transfer agent" rather than simply as a dehydrating agent; the water being removed from the reaction mixture by it and the esterification thus allowed to go to completion, the water being simultaneously released by the transfer agent and removed by the distillate as the temperature increases.

The process may be carried out in several ways. For example, the esterification may be commenced by placing the required amount of dehydrating material, alcohol, acid, and liquid used to form the ternary mixture in the reacting vessel and heating the mixture. As the temperature is raised a ternary mixture of alcohol, water, and the third liquid passes over and the esterificaton begins. While an appreciable amount of water remains in the reaction mixture the conversion does not approach completion. The dehydrating material takes up water from the reaction mixture and again liberates it during the distillation, thus at all times removing the water from the active zone of reaction and allowing the esterification to take place at a higher rate. At the beginning of the operation, the water is removed at a rapid rate by means of the ternary mixture; later, this operation slows up and the action of the dehydrating agent comes into more active play.

If desired, the dehydrating material may be added to the reaction mixture in the flask only after the greater portion of the water has been removed by distillation as a component of the ternary mixture. The mixture is then refluxed for a short time to allow the dehydrating material to take up the remaining water. During the course of this operation the esterification will proceed practically to completion. By adding more benzol and distilling, the water of crystallization may be removed from the salt and subsequently from the mixture as a component of a ternary mixture. In either case the salt is unchanged by use in the process and is in condition to be used again in another similar operation.

The advantages derived from the use of my process may most readily be shown by comparing it with an example of the processes previously used, such as that described above.

100 grams 75% lactic acid, 475 grams benzol, and 325 grams 95% ethyl alcohol are placed in a reaction flask and heated. When the temperature is raised to 64.8° C. a ternary mixture composed of alcohol, benzol, and water passes over. As soon as 650 grams of this distillate have been collected 9.7 grams of anhydrous aluminum sulphate and 325 grams benzol are added to the remaining reaction mixture. After refluxing for about one hour, 325 grams of distillate are removed. At the end of this time the conversion is found to be 94.5%. By the use of a slightly larger amount of benzol this conversion may be increased to 96.5%. If desired, the aluminum sulphate may be conveniently added to the reaction mixture at the beginning of the operation instead of after a portion of the water has been removed by the ternary mixture. Also, instead of adding an additional portion of benzol to the reaction mixture after a portion of the ternary mixture has been removed, the benzol may be allowed to separate out from the condensed ternary mixture, and continuously returned to the reaction vessel.

When the reaction has been completed the aluminum sulphate is allowed to settle and removed from the reaction mixture by filtration. The reaction mixture is then washed with water to remove any suspended aluminum sulphate. Any unconverted acid is neutralized and the ester then recovered by fractional distillation. The ester obtained by this method is low in acidity, water white in appearance, and sweet-smelling in odor.

It is understood that various modifications of the process described above may be used without departing from the spirit of my invention. In place of benzol, other materials which form ternary mixtures with water and the alcohol, such as toluol, hexane, carbon tetrachloride, etc., may be used. In place of anhydrous aluminum sulphate, I may employ other neutral or mildly acid salts, especially sulphates, which take up water of crystallization, such as copper sulphate, sodium arsenate, secondary sodium phosphate, etc.

It is understood also that my process may be applied to the preparation of other esters, as well as ethyl lactate, as for example, ethyl oxalate, ethyl tartrate, ethyl citrate, ethyl chloracetate, ethyl esters of succinic acid, etc. Furthermore, propyl alcohol or higher alcohols or polyatomic alcohols such as glycol or glycerol may be used instead of ethyl alcohol to produce the corresponding esters of any of these acids.

Having now described my invention, what I claim as new and desire to secure by Letters Patent is:—

1. A process for the production of an ester which comprises heating an alcohol and an acid in the presence of a liquid which forms a constant boiling mixture of minimum boiling point with water and the alcohol, and in the presence of a solid dehydrating agent.

2. A process for the production of an ester which comprises heating an alcohol and an acid in the presence of a liquid which forms a constant boiling mixture of minimum boiling point with water and the alcohol, and in the presence of neutral or slightly acid salts which take up water of crystallization.

3. A process for the production of an ester which comprises heating an alcohol and an acid in the presence of a liquid which forms a constant boiling mixture of minimum boiling point with water and the alcohol, and in the presence of substantially anhydrous aluminium sulphate.

4. A process for the production of ethyl lactate which comprises heating ethyl alcohol and lactic acid in the presence of a liquid which forms a constant boiling mixture of minimum boiling point with water and ethyl alcohol, and in the presence of substantially anhydrous aluminium sulphate.

5. A process for the production of an ester which comprises heating an alcohol and an acid in the presence of a liquid which forms a constant boiling mixture of minimum boiling point with water and the alcohol, removing part of the water as one component of a ternary distilling mixture, and then removing a further portion of the water from the reaction zone by means of salts which take up water of crystallization.

6. A process for the production of an ester which comprises heating an alcohol and an acid in the presence of a liquid which forms a constant boiling mixture of minimum boiling point with water and alcohol, removing part of the water as one component of a ternary distilling mixture, and then removing a further portion of the water from the reaction zone by means of neutral or slightly acid salts which take up water of crystallization.

7. A process for the production of an ester which comprises heating an alcohol and an acid in the presence of a liquid which forms a constant boiling mixture of minimum boiling point with water and alcohol, removing part of the water as one component of a ternary distilling mixture, and then removing a further portion of the water from the reaction zone by means of substantially anhydrous aluminium sulphate.

8. A process for the production of ethyl lactate which comprises heating ethyl alcohol and lactic acid in the presence of a liquid which forms a constant boiling mixture of minimum boiling point with water and ethyl alcohol, removing part of the water present in the reaction mixture as one component of a ternary distilling mixture, and then removing a further portion of the water from the reaction zone by means of substantially anhydrous aluminium sulphate.

9. A process for the production of ethyl lactate which comprises heating ethyl alcohol and lactic acid in the presence of a liquid which forms a constant boiling mixture with water and ethyl alcohol, and in the presence of a solid dehydrating agent.

10. A process for the production of ethyl lactate which comprises heating ethyl alcohol and lactic acid in the presence of a liquid which forms a constant boiling mixture with water and ethyl alcohol, and in the presence of neutral or slightly acid salts which take up water of crystallization.

11. A process for the production of ethyl lactate which comprises heating ethyl alcohol and lactic acid in the presence of a liquid which forms a constant boiling mixture with water and ethyl alcohol, removing part of the water present in the reaction mixture as one component of a ternary distilling mixture, and then removing a further portion of the water from the reaction zone by means of a solid dehydrating agent.

12. A process for the production of ethyl lactate which comprises heating ethyl alcohol and lactic acid in the presence of a liquid which forms a constant boiling mixture with water and ethyl alcohol, removing part of the water present in the reaction mixture as one component of a ternary distilling mixture, and then removing a further portion of the water from the reaction zone by means of neutral or slightly acid salts which take up water of crystallization.

In testimony whereof I affix my signature.

WILLIAM J. BANNISTER.